Patented July 19, 1949

2,476,936

UNITED STATES PATENT OFFICE 2,476,936

CATALYTIC POLYMERIZATION OF ALLYL ESTERS

Richard Whetstone, Berkeley, Calif., assignor to Shell Development Company, San Francisco, Calif., a corporation of Delaware No Drawing. Application March 28, 1945, Serial No. 585,385

4 Claims. (Cl. 260—89.1)

This invention relates to a method of catalytic polymerization. More particularly, the invention pertains to a method of catalyzing the polymerization of allyl esters of oxyacids.

A number of U. S. Patents like Nos. 2,273,891, 2,282,088, 2,306,139, 2,320,533, 2,322,310 and 2,332,461, describe polymerization of a variety of different compounds, among which are included allyl esters of oxyacids, with the aid of heat, oxygen or peroxide catalysts. It is stated in these patents that the polymerization can be interrupted or inhibited by addition of organic or inorganic salts or complexes of the reduced form of nickel to the polymer mixture or to the initial material. Likewise, U. S. Patent 2,306,136 describing the polymerization of unsaturated esters of oxalic acid with the use of heat, oxygen and peroxide catalysts, states that the polymerization can be interrupted by addition as inhibitor of organic and inorganic salts or complexes of nickel.

I have now discovered that the rate of polymerization of neutral oxyacid esters of beta,gamma-monoolefinic alcohols is accelerated by the presence of nickel and nickel salts of both organic and inorganic acids. Nickel and nickel compounds were found to have a pronounced ability to catalyze the polymerization of this particular class of polymerizable compounds, namely, the oxyesters of beta,gamma-monoolefinic alcohols such as the allyl esters of carboxylic acids and the allyl esters of inorganic oxyacids, both of which are difficult to polymerize in comparison with many other types of unsaturated esters, e. g. vinyl acetate. Furthermore, nickel and nickel salts when used as catalysts yield polymers which are of light color in contradistinction to dark colored polymers obtained by using other metals and salts as catalysts. This last mentioned discovery is of prime importance in the manufacture of the polymers for commercial utilization.

The discovery that nickel and compounds of nickel catalyze the polymerization of the particular class of unsaturated esters with which the invention is concerned will be evident from the results of tests given in the examples below.

EXAMPLE I

The catalytic effect of nickel and nickel compounds in the absence of other possible catalysts was first tested. The tests were made by sealing allyl acetate along with the substances to be tested for catalytic activity in Pyrex glass pressure tubes. The air was removed from the free space in the tubes and replaced with nitrogen since the oxygen in air is known to be a polymerization catalyst as will be evident from results with two tests wherein an air atmosphere was permitted to remain in the tubes. In most of the tests the tubes were sealed with the contents at room temperature and at normal pressure, although in several the tubes were evacuated to about 5 mm. pressure before sealing. The sealed tubes were heated for about 64 hours at a temperature of 200-210° C. The tubes were opened and the amount of polymer formed, which was a measure of the rate of polymerization, was determined by distilling the monomeric allyl acetate from the mixture at about 140° C. and 2 mm. pressure.

Table I

| Volume of Allyl Acetate, cc. | Catalyst | Atmosphere | Conversion to Polymer |
|---|---|---|---|
| | | | Per cent |
| 100 | None | $N_2$, 5 mm | 19.2 |
| 100 | ----do---- | ----do---- | 21.4 |
| 100 | ----do---- | $CO_2$ | 20.6 |
| 100 | ----do---- | $CO_2$, 5 mm | 23.3 |
| 250 | ----do---- | air | 29.1 |
| 100 | ----do---- | air, 5 mm | 29.1 |
| 100 | 10 g. nickel shot | $N_2$ | 39 |
| 100 | Raney nickel[1] | ----do---- | 31.5 |
| 100 | 5 g. of 60 mesh Monel[2] screen | ----do---- | 63.5 |
| 100 | 1 g. nickelous carbonate | ----do---- | 58.3 |
| 100 | 1 g. nickelic oxide | ----do---- | 40.7 |
| 100 | 1 g. nickel formate | ----do---- | 32.3 |
| 250 | 1 g. nickel acetate | ----do---- | 66.1 |
| 250 | 2 g. nickel acetate | ----do---- | 57.3 |
| 250 | 4 g. nickel acetate | ----do---- | 68.4 |
| 250 | 2 g. $Ni(OOCCH_3)_2 \cdot 4H_2O$ | ----do---- | 56.1 |
| 125 | 3 g. nickel acetate[3] | ----do---- | 78.2 |
| 250 | 1 g. nickel acetate | $CO_2$ | 71.0 |
| 250 | ----do---- | air, 5 mm | 74.9 |
| 250 | 1 g. nickel acetate and 4 g. nickel shot | $N_2$, 5 mm | 63.1 |

[1] Raney nickel is described in U. S. Patent No. 1,628,190.
[2] Monel metal is an alloy of nickel containing about 60% nickel, 33% copper and 7% iron.
[3] The nickel acetate had been deposited on the walls of the tube and on glass rods placed in the tube.

The foregoing results clearly indicate the catalytic effect of nickel in catalyzing the polymerization of allyl acetate. This catalytic effect is obtained regardless of whether the nickel is present with the allyl acetate, as the free metal, as preponderant constituent in an alloy with other metals, or as a compound or salt of nickel.

Nickel and compounds thereof employed as catalysts for the polymerization in the process of the invention have a marked rate-promoting effect as is evident from the foregoing results. Besides the various nickel compounds listed in Example I, other nickel salts can also be used such as, for example, nickel chloride, bromide, phosphate, nitrate, borate, fluoride, bromate, oxyiodide, chlorate, pyrophosphate, chromate, molybdate, propionate, citrate, benzoate, phthalate, butyrate, lactate, ferrocyanide, laurate, cyanide, oleate, stearate, tellurate, etc. While the catalytic activity varies to a certain extent amongst particular nickel compounds, as may be noted, the nickel salts of carboxylic acids are particularly suitable. Preferably the salts are of saturated monocarboxylic acids containing not more than 4 carbon atoms, and of these, nickel acetate is a most preferred catalyst. In using nickel and compounds thereof as catalysts for the polymerization, the nickel can be in the form of powders, granules, pellets and the like, or can be deposited on surfaces or carriers if desired.

The organic peroxides used in combination with nickel as catalysts include, besides tertiary butyl hydroperoxide described in Example I, such compounds, for example, as perbenzoic acid, peracetic acid, benzoyl peroxide, acetyl peroxide, acetyl benzoyl peroxide, tertiary amyl hydroperoxide, tertiary hexyl hydroperoxide, diamyl peroxide, ditertiary butyl peroxide, tetralin peroxide, ditertiary amyl peroxide, chloroditertiary butyl peroxide, dichloroditertiary butyl peroxide, tertiary butyl tertiary amyl peroxide, methyl tetralin peroxide, pelargonyl peroxide, capryl peroxide, hydroxy methyl tertiary butyl peroxide, lauryl peroxide, tertiary butyl perbenzoate, acetone peroxide, methyl ethyl ketone peroxide, diisobutylene peroxide, diethyl peroxide, etc.

The compounds polymerized according to the process of the invention are neutral oxyacid esters of beta,gamma-monoolefinic alcohols. By a beta,gamma-monoolefinic alcohol is meant an alcohol having a single olefinic double-bonded linkage between two carbon atoms which are in the beta and gamma positions with respect to the alpha carbon atom to which the hydroxyl group is directly linked. These alcohols contain a single olefinic linkage which is located between two carbon atoms of aliphatic character, to one of which carbon atoms is linked directly a saturated carbon atom having the hydroxyl group linked directly thereto, and preferably the alcohols contain no other elements than carbon, hydrogen, oxygen and halogen. The alcohols can be either primary, secondary or tertiary alcohols. They can contain any number of carbon atoms, although esters from those of more than 10 carbon atoms are less preferred. Preferably, the alcohols contain up to but not more than 6 carbon atoms. Also preferred are the primary monohydric alcohols. Esters of a particularly suitable class of alcohols are those of beta,alkyl-substituted allyl alcohols. The most preferred esters are those from allyl alcohol. Some specific representative examples of beta,gamma-monoolefinic alcohols used in the form of their oxyacid esters include allyl alcohol, methallyl alcohol, crotyl alcohol, tiglyl alcohol, buten-1-ol-3, penten-1-ol-3, 3-methyl-buten-1-ol-3, beta-chlorallyl alcohol, gamma-chlorallyl alcohol, 1-bromobuten-1-ol-3, 2-methyl-buten-1-ol-3, cinnamyl alcohol, penten-2-ol-1, hexen-2-ol-1, octen-2-ol-1, decen-2-ol-1, dodecen-2-ol-1, tetradecen-2-ol-1, 2-cyclohexenol, 2-cyclopentenol, beta-phenylallyl alcohol, beta-cyclohexylallyl alcohol, and the like. If desired, the esters can be from polyhydric alcohols such as, for example, 2-buten-1,4-diol, 2-penten-1,4-diol, 2-penten-1,5-diol, 2-chloro-2-buten-1,4-diol, 2-hexen-1,4-diol, 3-hexen-2,5-diol, 3-bromo-3-hexen-2,5-diol, 3-hexen-2,6-diol, 2-methyl-3-hexen-2,5-diol, 2-methyl-2-buten-1,4-diol, 1-phenol-2-buten-1,4-diol, 2-benzyl-2-penten-1,4-diol, 2-cyclohexyl-1,4-diol, 1-cyclohexyl-2-buten-1,4-diol, 3-cyclopentyl-2-penten-1,5-diol, etc.

Nickel and compounds thereof catalyze the polymerization of neutral esters of oxyacids. By a neutral ester is meant one in which all of the ionizable hydrogen of the oxyacid has been replaced by hydrocarbon radicals of the beta,gamma-monoolefinic alcohols. The oxyacids from which the esters are derivable contain oxygen and can be either carboxylic acids or inorganic oxyacids. Esters of carboxylic acids containing acetylenic or olefinic unsaturation are less preferred but are included within the purview of the invention. In this connection, reference is made to esters from such acids, for example, as acrylic, methacrylic, ethacrylic, propiolic, crotonic, cinnamic, maleic, fumaric, oleic, linoleic, etc. The acids devoid of olefinic and acetylenic unsaturation can be either mono or polycarboxylic acids. The esters of saturated fatty acids are very suitable, especially those containing not more than 12 carbon atoms like such acids as formic, acetic, propionic, butyric, isobutyric, valeic, caproic, lauric, etc. The esters of formic and acetic acids are particularly preferred. Esters of other monocarboxylic acids suitable for use, include, for example, benzoic, phenylacetic, chloracetic, trichloracetic, phenylpropionic, naphthoic and naphthenic, acids. The compounds can be esters of polycarboxylic acids including such representative acids as oxalic, malonic, succinic, tartaric, adipic, pimelic, tricarballylic, sebacic, phthalic, isophthalic, terephthalic, hexahydrophthalic, diglycollic, dilactic, dihydracrylic, etc. The esters of inorganic oxyacids are also suitable, but form a less preferred group. Thus, the esters can be, for example, beta,gamma-monoolefinic alcohol borates, sulfates, phosphates, phosphites, aluminates, titanates, silicates, stannates, germanates, etc. Ordinarily, when polymerization of the ester of a polybasic acid is effected, an ester of a single alcohol is used although a mixed ester can be catalytically polymerized if desired, such as allyl methallyl, phthalate, or allyl crotyl carbonate, for example.

For the purpose of illustrating the catalytic effect of nickel in polymerizing a reasonable number of typical esters of the class with which the invention is concerned, the following examples are given.

EXAMPLE II

The polymerization of the esters noted in the table below was effected in sealed glass pressure tubes as described in Example I. The tubes were heated at about 200° C. for 65 hours.

Table II

| Ester | Volume of Ester | Added Catalyst | Atmosphere | Conversion to polymer |
|---|---|---|---|---|
| | Cc. | | | |
| Allyl propionate | 250 | 2.5 g. nickel acetate | N₂, 5 mm | 62.3% |
| Do | 100 | 2.5 g. nickel acetate | do | 75.0 |
| Allyl butyrate | 180 | None | air | 28.5 |
| Do | 180 | 2.5 g. nickel acetate | N₂, 5 mm | 36.7 |
| Allyl laurate | 180 | None | air | 26.2 |
| Do | 180 | 2.5 g. nickel acetate | N₂, 5 mm | 73.2 |
| Allyl benzoate | 100 | do | do | 61.9 |
| Methallyl acetate | 50 | None | air | 14.7 |
| Do | 50 | 1 g. nickel acetate | N₂ | 28.0 |
| Triallyl borate | 50 | None | do | (0.0079)¹ |
| Do | 50 | 1 g. nickel acetate | do | (0.0103)¹ |
| Do | 200 | 1% t-butyl hydroperoxide+nickel | air | 24.8 |
| Do | 200 | 1% t-butyl hydroperoxide+nichrome² | do | 35.4 |

¹ The values given in parentheses are the increase in refractive index (20/D) of the monomer-polymer mixture after the treatment over the original material. Since the polymer has a higher refractive index than the monomer, the increase of refractive index is a measure of the extent of conversion to polymer.
² Nichrome is an alloy of nickel containing about 60% nickel, 15% chromium and 25% iron.

While the foregoing description of the invention has emphasized the catalytic effect of nickel, either as the metal or as compounds thereof, in preparation of homopolymers of the neutral oxyacid esters of beta,gamma-monoolefinic alcohols, nickel also catalyzes polymerization of copolymers. Thus, two or more of the esters can be copolymerized in such proportions as are desired merely by contacting a mixture of the esters with the nickel catalyst under polymerizing conditions. The preparation of some typical copolymers is demonstrated in detail by the following example.

EXAMPLE III

Allyl acetate was copolymerized with the other allyl esters listed in the table below, the proportion of the other component being on a volume percentage basis. The polymerization was effected in sealed glass tubes as described in Example I. In those cases where nickel acetate was used as catalyst the amount was about 1% of the ester mixture. The tubes were heated for about 65 hours at 200° C.

Table III

| Other Allyl Ester | Catalyst | Atmosphere | Conversion to Copolymer |
|---|---|---|---|
| | | | Per cent |
| 5% diallyl phthalate | None | air | 24.2 |
| Do | Nickel acetate | N₂, 5 mm | 80.5 |
| 10% diallyl phthalate | None | air | 37.6 |
| Do | Nickel acetate | N₂, 5 mm | 72.0 |
| 5% diallyl carbonate | do | do | 67.1 |
| 10% diallyl carbonate | do | do | 72.3 |
| 5% diallyl oxalate | do | do | 11.3 |
| 10% diallyl oxalate | do | do | 17.4 |
| 15% allyl propionate | do | do | 64.9 |
| 25% allyl propionate | do | do | 68.6 |
| 40% allyl propionate | do | do | 59.4 |
| 5% allyl benzoate | do | do | 55.7 |

If desired, metallic nickel or compounds of nickel can be employed in copolymerizing the neutral oxyacid esters of beta,gamma-monoolefinic alcohols with one or more other polymerizable compounds such as, for example, methyl methacrylate, methylacrylate, vinyl chloride, vinyl acetate, styrene, dichlorostyrene, ethyl chloroacrylate, diallyl ether, etc.

The polymerization of the esters is effected by contacting the ester in liquid phase with the nickel-containing catalyst at a temperature above 50° C. but below the temperature at which appreciable decomposition occurs. At temperatures above 300° C. the decomposition of the monomer and/or polymer becomes appreciable. Furthermore, at temperatures below about 100° C. the rate of reaction is so slow that the polymerization is not commercially practicable. Consequently, a preferred temperature range is from 100 to 300° C., and most preferably a temperature of 175 to 250° C. is employed. Since the polymerization reaction occurs in the liquid phase, sufficient pressure is used in executing the process of the invention so that at least the bulk of the material being polymerized is maintained liquid at the operating temperature.

The particular temperature of polymerization governs the molecular weight of the formed polymer, i. e. the degree of polymerization. In general, the higher the temperature of polymerization the lower the degree of polymerization or molecular weight of the polymer.

The rate of polymerization is increased with increasing temperature, other variables being equal. This increased rate is manifested by increased conversion to polymer at increased temperatures. The time of contact of the ester with the catalyst also effects the amount of conversion to polymer. However, it appears that the amount of conversion goes up to a limiting range and then longer times of contact do not materially increase the percentage of conversion to polymer.

The effects of temperature and time will be more apparent from the results given in the following examples.

EXAMPLE IV

Allyl acetate was polymerized in sealed glass tubes as described in Example I. About 1% of nickel acetate was used as catalyst. The results with varying temperature and time are given in the table below.

Table IV

| Temperature | Time | Atmosphere | Per cent |
|---|---|---|---|
| | Hours | | |
| 105° C | 64 | N₂ | 4.1 |
| 105° C | 208 | N₂ | 5.1 |
| 200° C | 53 | N₂, 5 mm | 67.3 |

EXAMPLE V

The effect of variation of time of contact is seen by the results in the table below which were obtained by polymerizing allyl acetate in sealed glass tubes as described in Example I. About 250 cc. of allyl acetate was used with 3 grams of crystalline granules of nickel acetate as catalyst. The free space in the tubes contained nitrogen evacuated to 5 mm. pressure at room temperature. The tubes were heated for the indicated lengths of time at 205–210° C. and the conversion to polymer was determined.

Table V

| Time | Conversion to Polymer |
|---|---|
|  | Per cent |
| 19 hrs | 23.2 |
| 24 hrs | 39.1 |
| 45 hrs | 72 |
| 66 hrs | 78.8 |

EXAMPLE VI

While a single nickel-containing catalyst can be used, it is sometimes desirable to employ a mixture of different nickel-containing catalysts in combination. For execution of this embodiment of the invention, allyl acetate was polymerized in a metallic pressure bomb constructed of nickel. About 1% of nickel acetate granules was used in combination with the metallic nickel as catalyst. The free space in the bomb had the air therein displaced by nitrogen at room temperature before closing the bomb. The results in the table below illustrate the use of these different nickel catalysts in combinations as well as the effects of variation of temperature and time on the conversion to polymer.

Table VI

| Temperature | Time | Conversion to Polymer |
|---|---|---|
|  | Hours | Per cent |
| 175° C | 24 | 9.5 |
| 200° C | 12 | 27.3 |
| 200° C | 25 | 52 |
| 225° C | 6 | 32.0 |
| 225° C | 12 | 63.0 |
| 225° C | 24 | 72.5 |
| 250° C | 2 | 70.4 |

The process of the invention is effected with the materials undergoing polymerization in substantially anhydrous condition. By substantially anhydrous is meant with a water content of less than about 1%. While it would be desirable to conduct the polymerization with completely anhydorus materials, this is not practical in commercial application of the process of invention, nor does it appear necessary. With amounts of water of about 0.5% in the esters undergoing polymerization, little detrimental effect is obtained because of the presence of the water. Nevertheless, it is desirable that the proportion of water be kept below about 1%, as can readily be realized in using commercial methods of manufacturing the esters subjected to polymerization by the method.

The character of the products obtained by the process depends upon the particular type of ester which is polymerized. When singly unsaturated esters like allyl acetate, for example, are polymerized, the polymers formed are substantially linear in character, e. g. the polymers are fusible and soluble in common organic solvents. When the esters contain multiple aliphatic unsaturation (as is the case with diallyl phthalate, triallyl borate and allyl methacrylate), the polymerization can pass successively from soluble and fusible polymer to an insoluble but fusible gel polymer and then to an insouble and infusible final form of polymer. In applying the process of the invention to polymerization of esters containing such multiple alihpatic unsaturation, it is desirable to operate so the polymer formed is not polymerized past the soluble and fusible stage. This is accomplished by having the time of contact at the operating temperature sufficiently short so the gel form of polymer is not produced. The proper time of contact can be determined by trial and error experiments. The desired reaction conditions are chosen and the time required to obtain gel formation is determined. The production of only soluble and fusible polymer or partial polymer is accomplished by using a shorter time of contact than that needed to give the first formation of gel as determined by the test. The process of the present invention is particularly suitable for producing these soluble fusible partial polymers of the multiple unsaturated esters. When singly unsaturated esters are polymerized no precautions are needed since the polymers are substantially linear in character and are not subject to forming insoluble gels or more advanced forms of polymer.

Nickel and the nickel compounds are insoluble or substantially insoluble in the esters which are polymerized. Accordingly, no substantial loss of catalytic material in the polymer mixture occurs. When the catalysts are used in batchwise polymerization as pellets and granules, the catalyst can be recovered and reused again. However, the nickel compounds gradually lose their activity in time. The nickel salts of carboxylic acids can have the catalytic activity restored to considerable extent by heating the used catalyst salt with the same carboxylic acid from which it is derived, and then evaporating off any excess acid. Results obtained on reusing nickel salt catalysts and then regenerating with reuse again, are illustrated in the examples below.

EXAMPLE VII

Nickel acetate was employed for polymerizing allyl acetate in a glass pressure tube, about 3 grams of the nickel salt being used with 250 cc. of allyl acetate. With the contents of the tube at room temperature, the air was displaced with nitrogen which was then pumped down to about 5 mm. pressure before sealing tube. The tubes were heated for about 65 hours at 205–210° C. The amount of polymer formed was determined by vacuum distillation of the monomer from the polymer. The following table shows the results obtained in using fresh catalyst, in reusing the catalyst, and in using the regenerated catalyst. The nickel salt was regenerated by heating with a few cc. of glacial acetic acid and distilling the excess acid therefrom under vacuum.

Table VII

| Catalyst | Conversion to Polymer |
|---|---|
|  | Per cent |
| Fresh nickel acetate | 83.0 |
| Used nickel acetate | 51.2 |
| Regenerated nickel acetate | 68.8 |

Metallic nickel, if used as recommended in this application, appears to have substantially indefinite catalyst life. This is especially true in polymerizing singly unsaturated esters such as allyl formate and acetate. However, if the temperature of operation is so high that appreciable decomposition occurs with carbonization, the nickel will become coated with carbon and its catalytic activity will be greatly diminished. Also if esters containing multiple unsaturation are used like diallyl phthalate, which are subject to gel formation, and if the conditions are such that gel formation occurs, even though only to small extent, the gel will become coated on the nickel and cause the catalytic effect of it to be lost. Therefore, it is desirable to operate at proper temperatures and proper contact times so neither carbonization nor gelation occurs.

This application is a continuation-in-part of my copending application, Serial No. 515,837, filed December 27, 1943, now abandoned.

I claim as my invention:

1. A process for producing thermoplastic polymer of the ester of a beta,gamma-monoolefinic monohydric primary alcohol of 3 to 6 carbon atoms and a saturated monocarboxylic acid of up to 12 carbon atoms which consists of heating said ester under substantially anhydrous conditions at a temperature above 50° C. but below the temperature at which appreciable decomposition occurs for a time sufficient to effect appreciable polymerization of said ester, said polymerization being catalyzed by having said ester in the presence of a nickel salt of a saturated monocarboxylic acid of up to 4 carbon atoms.

2. A process for producing thermoplastic polymer of an allyl ester of a saturated carboxylic acid of up to 12 carbon atoms which consisst of heating said ester in liquid phase under substantially anhydrous conditions at a temperature of 100° C. to 300° C. for a time sufficient to effect appreciable polymerization of said ester, said polymerization being catalyzed by having said ester in the presence of a nickel salt of a saturated monocarboxylic acid of up to 4 carbon atoms.

3. A process for producing thermoplastic polymer of allyl acetate which consists of heating allyl acetate in liquid phase under substantially anhydrous conditions at a temperature of 175° C. to 250° C. for a time sufficient to effect appreciable polymerization of the allyl acetate, said polymerization being catalyzed by having the allyl acetate in the presence of nickel acetate.

4. A process for producing thermoplastic polymer of allyl formate which consists of heating allyl formate in liquid phase under substantially anhydrous conditions at a temperature of 175° C. to 250° C. for a time sufficient to effect appreciable polymerization of the allyl formate, said polymerization being catalyzed by having the allyl formate in the presence of nickel acetate.

RICHARD WHETSTONE.

REFERENCES CITED

The following references are of record in the file of this patent:

UNITED STATES PATENTS

| Number | Name | Date |
| --- | --- | --- |
| 1,891,203 | Ambros | Dec. 13, 1932 |
| 2,129,665 | Barrett | Sept. 13, 1938 |
| 2,136,425 | Fields | Nov. 15, 1938 |
| 2,251,983 | Chitwood | Aug. 12, 1941 |
| 2,289,765 | Fields | July 14, 1942 |
| 2,273,891 | Pollack | Feb. 24, 1942 |
| 2,321,942 | Rothrock | June 14, 1943 |
| 2,380,474 | Stewart | July 31, 1945 |
| 2,380,475 | Stewart | July 31, 1945 |
| 2,383,055 | Fryling | Aug. 21, 1945 |
| 2,384,571 | Semon | Sept. 11, 1945 |
| 2,395,017 | Semon | Feb. 19, 1946 |

FOREIGN PATENTS

| Number | Country | Date |
| --- | --- | --- |
| 514,116 | Great Britain | Oct. 31, 1939 |

OTHER REFERENCES

Mattiello, Protective and Decorative Coatings, vol. I, page 532, John Wiley and Sons, Inc., New York (1941).